(12) United States Patent
Liu et al.

(10) Patent No.: US 6,233,250 B1
(45) Date of Patent: May 15, 2001

(54) SYSTEM AND METHOD FOR REDUCING LATENCY IN SOFTWARE MODEM FOR HIGH-SPEED SYNCHRONOUS TRANSMISSION

(75) Inventors: Young Way Liu, La Mirada; Chin-I Huang, San Jose, both of CA (US); Ta-Yung Lee, Taipei (TW); Wen-Ching Andy Chou, Sunnyvale, CA (US); Dean C. Wang, Milpitas, CA (US); Ming-Kang Liu, Cupertino, CA (US)

(73) Assignee: Integrated Telecom Express, Inc., San Jose, CA (US)

( * ) Notice: Subject to any disclaimer, the term of this patent is extended or adjusted under 35 U.S.C. 154(b) by 0 days.

(21) Appl. No.: 09/191,569

(22) Filed: Nov. 13, 1998

(51) Int. Cl.[7] .................................. H04J 3/16; H04J 3/07
(52) U.S. Cl. ........................... 370/469; 370/235; 370/506
(58) Field of Search ..................................... 370/282, 352, 370/353, 354, 395, 397, 466, 469, 474, 506, 505, 232

(56) References Cited

U.S. PATENT DOCUMENTS

| | | | |
|---|---|---|---|
| 5,003,558 | 3/1991 | Gregg | 375/108 |
| 5,251,236 | 10/1993 | Brehmer et al. | 375/59 |
| 5,341,376 | * 8/1994 | Yamashita | 370/466 |
| 5,359,600 | * 10/1994 | Ueda et al. | 370/399 |
| 5,367,534 | 11/1994 | Chou et al. | 375/8 |
| 5,499,384 | 3/1996 | Lentz et al. | 395/821 |
| 5,541,926 | * 7/1996 | Saito et al. | 370/474 |
| 5,577,037 | * 11/1996 | Takatori et al. | 370/395 |
| 5,604,870 | 2/1997 | Moss et al. | 395/280 |
| 5,671,396 | 9/1997 | Gavish | 395/500 |
| 5,682,508 | 10/1997 | Hocker | 395/200 |
| 5,721,830 | 2/1998 | Yeh et al. | 395/200.67 |
| 5,724,413 | 3/1998 | Suffern et al. | 379/98 |
| 5,742,600 | * 4/1998 | Nishihara | 370/395 |
| 5,756,280 | 5/1998 | Soora et al. | 455/4.2 |
| 5,764,637 | * 6/1998 | Nishihara | 370/397 |
| 5,799,064 | 8/1998 | Sridhar et al. | 379/98 |
| 5,802,153 | 9/1998 | Sridhar et al. | 379/98 |
| 5,809,075 | 9/1998 | Townshend | 375/254 |
| 5,822,548 | 10/1998 | Story et al. | 395/286 |
| 5,825,765 | 10/1998 | Menzilcioglu et al. | 370/394 |
| 5,933,426 | * 8/1999 | Motoori | 370/352 |
| 6,021,120 | * 2/2000 | Beyda et al. | 370/282 |
| 6,049,531 | 4/2000 | Roy | 370/260 |
| 6,084,880 | 7/2000 | Bailey et al. | 370/395 |
| 6,112,266 | 8/2000 | Yeh | 710/52 |

FOREIGN PATENT DOCUMENTS

| | | |
|---|---|---|
| 0016534 | 3/2000 | (WO) . |
| 0025498 | 5/2000 | (WO) . |

* cited by examiner

*Primary Examiner*—Wellington Chin
*Assistant Examiner*—Brenda H. Pham
(74) *Attorney, Agent, or Firm*—Law+

(57) ABSTRACT

An ADSL physical transmission layer retrieves data to be transmitted from either a transmit data buffer, or a dummy cell buffer in the case when no actual data is being transmitted to maintain a continuous data stream in an ADSL data link. The ADSL physical transmission layer and an associated ATM protocol layer are implemented as an interrupt service routine and delayed procedure call respectively in an ADSL software modem application. Because the ATM protocol layer does not fill the transmit data buffer with dummy cell data, it is simpler and faster. Moreover, latency is minimized, and overall system throughput enhanced since the maximum latency is independent of any operating system latency, and is no greater than the size of the cell stored in the dummy cell buffer. The invention has significant potential for beneficial use in an ADSL based software modem where wide variations in performance and latency of computing systems pose engineering challenges in maintaining a continous data link between a real time transceiver and a non-real time operating system.

62 Claims, 3 Drawing Sheets

FIG. 1

SYSTEM AND METHOD FOR REDUCING LATENCY IN SOFTWARE MODEM FOR HIGH-SPEED SYNCHRONOUS TRANSMISSION

FIELD OF THE INVENTION

The invention relates generally to asynchronous data transfer over a high-speed synchronous transmission system, such as those utilizing ATM transport over a Digital Subscriber Line (DSL). More particularly, the present invention is directed to latency minimization between a host computing system and an ADSL transceiver.

BACKGROUND OF THE INVENTION

In a high-speed synchronous transmission system, modulated symbols are sent continuously in time. When it is implemented by a computer host processor (so called software modem), it is extremely critical to maintain a continuous bit stream output between the real time transceiver and the non-real time host system (such as a local host computing system running an operating system such as Microsoft Windows® NT or the like). To reduce transport delay, latencies between each interface located in the data path (i.e., between the upstream transceiver to operating system) must be kept to a minimum.

There are a number of such interfaces in such data path, and various mechanisms have been proposed to ensure a continuous stream of demodulated/modulated data. First, an analog channel interface portion of a downstream ADSL transceiver is responsible for receiving, transmitting, processing analog data signals, and maintaining a synchronized data link through a channel to an upstream transceiver interface. This is a real-time link, and accordingly a modulated signal must be present (at some level, even in reduced power management modes) at all times. An example of a prior art approach for ensuring that the data link is kept synchronized, even when one end is connected to an asynchronous source, is U.S. Pat. No. 5,003,558. This reference teaches sending an "idle" signal to keep the link active even when there is no real data, but, notably, does not address the problem of how to cure latencies which may be present in such asynchronous source.

Next after the channel interface portion in the data path lies a physical layer transport circuit. This portion of the data link is responsible for modulating and demodulating data symbols. To reduce latencies between the channel interface and the physical layer, Receive/Transmit FIFO buffers are used. This technique is well known in the art, and an example of this type of technology is depicted in U.S. Pat. Nos. 4,823,312 and 5,140,679 assigned to National. Accordingly, there are reasonably well developed solutions to the problems of latency and transport delay between a channel interface and physical layer in an ADSL transceiver, and this portion of the data path can be maintained as real time without undue cost and/or complexity.

A larger challenge is posed, however, by the data path located between the physical layer and the logical layer, in this case, an ATM protocol layer. The ATM protocol layer is required to interface both with the physical layer (a real time data path) and with the operating system (an asynchronous data path). To reduce latencies between these two interfaces, one approach would be to use the same kinds of Receive/Transmit FIFO buffers as explained earlier between the channel interface and physical layer. In this respect, on the receive side of the data path, it is possible to use a sufficiently large Receiver buffer to compensate for latencies inherent in the operations of the ADSL physical layer and ATM protocol layer when the latter are implemented in a software modem. Such latencies arise from the fact that, in a software modem context, both such functions are performed by the host processing device executing routines of different priority. For instance, in a Windows operating system, the ADSL physical layer is configured as an Interrupt Service Routine (ISR), while the ATM protocol layer is set up as a lower priority Delayed Procedure Call (DPC). The ADSL Physical layer is configured as a high priority task in the operating system, because, in this manner, latency between this layer and the channel interface is reduced, and the buffers between such interfaces can be reduced as well.

Because a DPC is a lower priority task than an ISR, however, there is an inherent latency between the physical layer and ATM operations, and a Receiver buffer must be employed between the two to handle such disparity. Nevertheless, when a buffer is used, a transport delay is introduced, which, of course, is undesirable. To reduce this delay, the buffer size must be correspondingly reduced. This design goal of course must be tempered by the fact that the buffer must be at least large enough to accommodate expected latencies caused by the difference in priorities of the ADSL Physical Layer and the ATM protocol layer. One proposed solution would be to make the ATM protocol an ISR as well, so that there is no latency between the ADSL Physical Layer and the ATM protocols. This approach is unattractive for the plain fact that ATM protocols require many system calls that cannot be accommodated in an ISR routine, because such routines must be executed in a very short period of time.

Consequently, in most ADSL software modem systems, it is expected there will be a buffer interface between the ADSL physical layer and the ATM protocol. The size of the buffer can be varied, of course, depending on the expected channel data rate, expected operating system latencies, etc. In a typical PC using Microsoft Windows, a latency time of about 10 to 30 msec is contemplated. It is, of course, extremely critical to reduce this latency as much as possible to ensure efficient data transmissions across the entire data link.

One approach suggested in the prior art (such as described in the aforementioned references above) is to include some kind of threshold fill point, or "water mark" for the receive and transmit buffers. In the transmit direction, a transmit buffer water mark is set to some value that is close to the full capacity of the buffer size. When the data in the buffer drops below this mark, an ATM protocol layer routine is activated and more data is loaded (poured in) in the transmit buffer. Accordingly, at any moment in time, an amount of data equal to the transmit buffer water mark level is available to sustain continuous data transmission due to system latency. In the receiving direction, a receive buffer water mark is set to some value close to the empty capacity of the buffer size. When the buffer fills with data above this level, the ATM protocol layer routine is again activated and more data is extracted (poured out) from the receive buffer. Accordingly, at any moment in time, an amount of data equal to the capacity above the receive water mark level is available for the synchronous receiver to store received data due to system latency.

The problem with this approach is the fact that there is often no real data to be transmitted by the operating system to the upstream transmitter, yet the data link on the upstream side must be maintained. As a result, after verifying from the operating system that there are no applications transmitting data, the ATM protocol layer routine must load the buffer with "dummy" data corresponding to a fixed pattern recognizable by the upstream transmitter as such, in a manner similar to that noted in U.S. Pat. No. 5,003,558 discussed above Performing this extra task, however, consumes valuable processing time, and reduces system efficiency. Moreover, by loading the transmit buffer with "dummy" ATM cells, overall data transport latency increases because such data must be flushed in serial fashion through the channel to the upstream transceiver, even when new transmit data is available from the operating system.

Accordingly, the commonly suggested techniques for handling latency in an ADSL software environment while maintaining a synchronous link are impractical, and, in many cases, inefficient.

SUMMARY OF THE INVENTION

An object of the present invention, therefore, is to provide an improved system and method for maintaining a continuous and uninterrupted ADSL data bit stream between an operating system implementing a downstream transceiver, and a remote upstream transmitter;

A further object of the present invention is to provide an improved ATM protocol system and method which is simpler to implement in an ADSL software transceiver;

A related object of the present invention is to provide an improved system and method for reducing overall data transport latency in a data path between an operating system implementing a downstream transceiver, and a remote upstream transmitter.

A further object of the present invention is to apply the above methods in any high-speed synchronous transmission systems which must include a source of asynchronous traffic transport.

A system of the present invention therefore eliminates latencies caused by asynchronous data transport requirements associated with a synchronous data channel, which, in a preferred embodiment, carries ADSL signals in accordance with known protocols and standards. The system first includes a logical data layer, which is coupled to the asynchronous operating system, which can be a personal computer. This logical layer receives data blocks corresponding to actual data to be transmitted by applications running on an asynchronously running operating system. These data blocks are converted into actual data logical blocks. A transmit data buffer is coupled to the logical data layer, and stores the actual data logical block after it is processed by the logical data layer. A dummy data buffer is used for storing a dummy data logical block corresponding to a logical data block containing no actual operating system data, i.e., a fixed data pattern that can sent on the synchronous data link as fill data to maintain synchronization. A physical data layer is also coupled to the transmit data buffer, the dummy data buffer, and the synchronous data channel. The physical data layer converts the actual data logical blocks into actual data digital signals for transmission in the synchronous data channel. It also converts the dummy data logical blocks to dummy data digital signals for transmission in the synchronous data channel to maintain synchronization as noted. Thus, the physical data layer transmits real data digital signals to the synchronous data channel when there is an actual data logical block in the transmit data buffer and otherwise transmits the dummy data digital signals. The dummy data logical block is selected to be equal in size to a single actual data logical block to facilitate handling by the physical layer.

The advantages of this approach are many, and include the fact that the latency is reduced because dummy data is not stored in the transmit buffer, and the fact that the logical layer does not waste time storing such dummy data in the first place. Furthermore, the latency in the synchronous data channel is limited to be no more than the time required to transmit a single dummy data logical block. More importantly, it can be seen that the latency is substantially independent of any latency caused by the asynchronous operating system.

In a preferred embodiment, the latency reduction system is used within a software modem environment.

In this regard, the logical data layer is implemented as an ATM protocol layer, which has a transmit routine for converting the asynchronous data block into an actual logical data block corresponding to an ATM cell. Such protocol layer can be implemented in hardware, or preferably, as an ATM protocol routine executed by a processing device within the asynchronously operating computing system. The transmit portion (subroutine) of the ATM protocol routine is specifically configured, therefore, so that when no actual operating system data is available for transmission, it does load any data (or dummy data cells) into the transmit data buffer. The transmit portion of the ATM protocol routine is preferably activated or invoked whenever the transmit data buffer contains an amount of data less than a transmit threshold value (or water mark). Further in a preferred embodiment, the physical data layer is an ADSL physical layer routine executed by the processing device. Such physical layer can be implemented in dedicated front end transceiver hardware, or preferably as an ADSL physical data layer routine which is executed with a higher priority (or lower latency) than the ATM protocol routine. The ADSL physical layer transmit routine sends a dummy data digital signal when there is no data, but does not load such data from the transmit data buffer. At the end of such operation, it checks the transmit data buffer to determine if any actual data logic block should be converted and transmitted. If yes, it does not send any further dummy data, and goes on to send real data. This operational feature ensures the maximum 1 dummy cell maximum latency length.

A preferred embodiment of an ADSL transceiver implemented in accordance with the present invention includes the aforementioned latency reduction system, as well as a number of additional transmit and receive components. In particular, a downstream transceiver front end circuit is coupled to the physical data layer and converts the real data digital signals and the dummy data digital signals into real data analog signals and dummy data analog signals respectively for transmission through the synchronous channel to a second upstream transceiver. As part of this front end, a second transmit data buffer is coupled between the physical data layer and the downstream transceiver front end circuit for storing data corresponding to the real data digital signals and the dummy data digital signals. Such front end also includes a first receive data buffer coupled between the physical layer and the downstream transceiver front end circuit for storing data corresponding to received data digital signals from the upstream transceiver. In addition, a second receive data buffer is coupled between the physical data layer and the logical data layer for storing data corresponding to received data logical blocks from the upstream transceiver. This latter structure helps minimize latency on the receive side of the transmitter.

The latency reducing system of the present invention, including the physical layer and logical layer routines, can also be implemented in a computer program executable within the aforementioned operating system. Alternatively, the system can be embedded in silicon form such as in a programmed ROM or the like which can be executed by a dedicated hardware DSP.

A preferred method of transmitting data between a synchronous data channel and an asynchronous operating system based on the present invention accomplishes this objective by generally performing the following steps: (a) determining if there is actual data to be transmitted by the asynchronous operating system; (b) converting any such actual data into an actual data logical block; and (c) buffering the actual data logical block; and (d) determining whether an actual data logical block has been buffered; and (e) when an actual data logical block has been buffered, converting the actual data logical block into actual data digital signals for transmission in the synchronous data channel; and when no actual data logical block has been buffered, converting a dummy data logical block to dummy data digital signals for transmission in the synchronous data channel.

As noted above, the actual logical data block preferably corresponds to an ATM formatted cell. Again, too, only actual data logic blocks are buffered, which reduces latency significantly. When the number of actual data logical blocks falls below a predetermined threshold value, steps (a) through (c) are repeated. Since only actual data is stored in the transmit buffer, the use of the water mark or threshold provides significant performance advantage because it now more accurately reflects transmit data status. As also alluded to above, the aforementioned steps are preferably performed by various routines executed by a software modem. As such, these steps are performed by a number of routines executed by a processing device within the asynchronous computing system. Also, as noted earlier, the logical layer routine is executed with a lower priority than the physical layer routine. The same latency improvement advantages as outlined above are possible with the disclosed method therefore.

A method of implementing an ADSL transceiver, therefore, includes the aforementioned latency reducing process, as well as further necessary steps. These include, generally, a step (f): converting the real data digital signals and the dummy data digital signals into real data analog signals and dummy data analog signals respectively for transmission through the synchronous channel to a second upstream transceiver. Again, an additional step (g) can also be employed of buffering data corresponding to the real data digital signals and the dummy data digital signals. On the receiving side, the preferred method includes a step (h): buffering data corresponding to received data digital signals from the upstream transceiver. An additional step (i): buffering data corresponding to received data logical blocks from the upstream transceiver is also executed.

Although the inventions are described below in a preferred embodiment involving an ADSL transceiver, it will be apparent to those skilled in the art the present invention would be beneficially used in many environments where it is necessary to minimize latencies in a real time data transmission path for non-real time traffic transport.

DETAILED DESCRIPTION OF THE INVENTION

Figure 1:
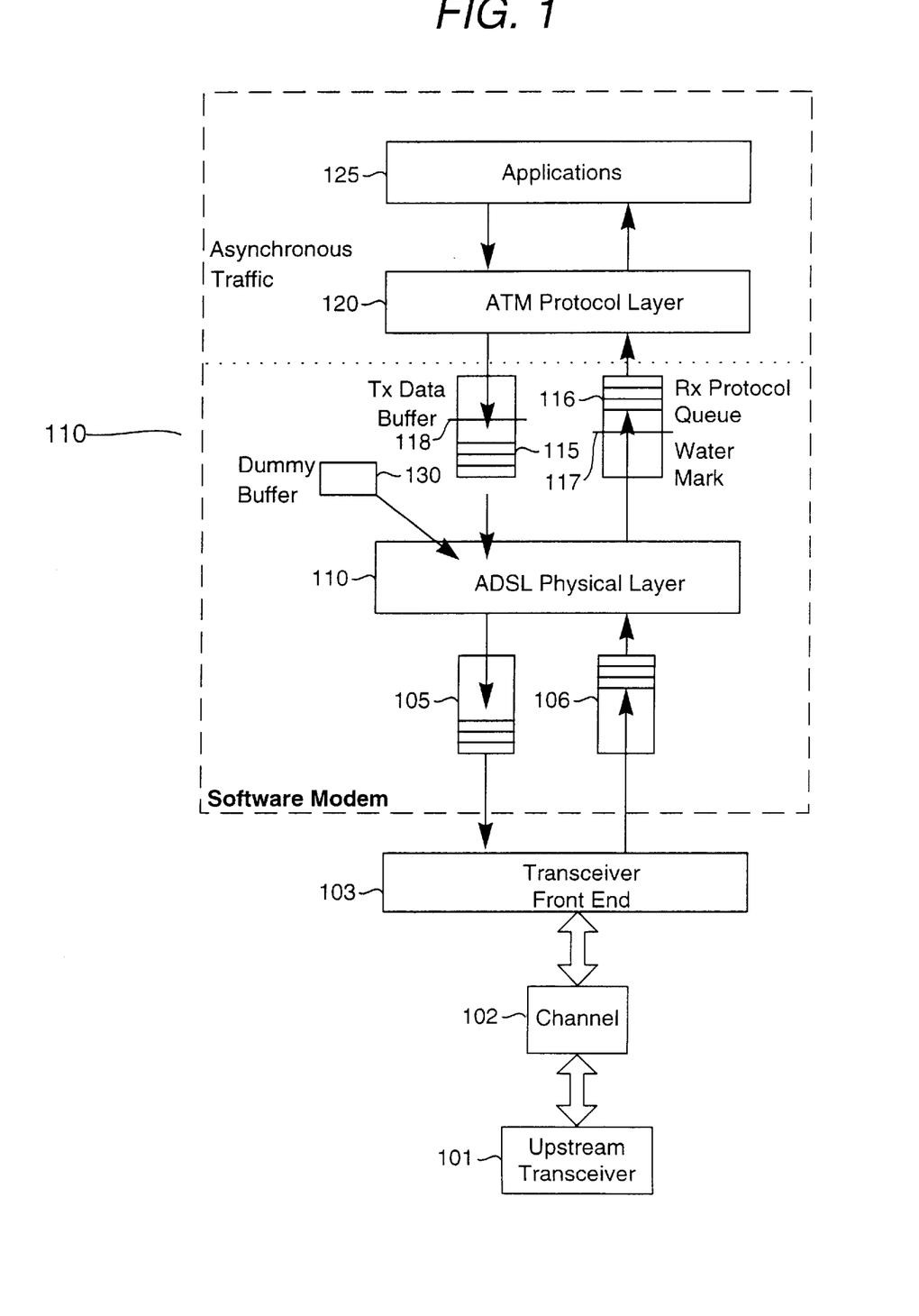
FIG. 1 is a block diagram illustrating an embodiment of a system implemented in accordance with the teachings of the present invention.

A preferred embodiment of a system 100 of the present invention is illustrated in FIG. 1. With the exception of some of the details of the transmit buffer logic used in the present system, the other components shown in FIG. 1 are well-known ADSL transceiver circuits, and hence will not be explained in detail herein. System 100 is a downstream ADSL transceiver coupled through a channel 101 to an upstream transceiver 102. A continuous data stream is maintained in both a downstream and upstream direction between such transceivers. This is done so that synchronization is maintained, and overall data transport latency is minimized. An analog front end (AFE) 103 of transceiver 100 includes conventional telephone line interface, an optional splitter, various filters, and an analog to digital Converter circuit for converting a received ADSL signal to a series of digital samples. Corresponding circuitry on the transmit side converts a series of digital samples into analog data signals for transmission through channel 101. The specifics of AFE 13 are well-known in the art, and as they are not material to the present invention, a detailed explanation of the same is not necessary to an understanding of the present teachings.

An ADSL Physical Layer 110 is coupled to AFE 103 through a first receive buffer 106. As mentioned above, ADSL Physical Layer 110 is preferably an ISR implemented on a personal computing system using the Microsoft Windows operating system. This ISR, as is apparent, performs both receive and transmit functions in receive and transmit routines respectively. Generally speaking, both of these routines have a high priority and are responsible for, among other things, demodulating/modulating the received DMT digital samples and converting them into a received/transmit data stream.

The other side of ADSL Physical Layer 110 is coupled through a second receiver buffer 116 to ATM Protocol layer 120. As noted earlier, ATM protocol layer 120 is preferably a DPC implemented on a personal computing system using the Microsoft Windows operating system. The functions and operations performed by ATM protocol layer 120 include generally, among other things, conversion of received ATM data cells into Internet Protocol (IP) packets, which can be handled by IP applications within the computing system, and conversely, conversion of any transmit data from such applications into ATM cells before ADSL Physical layer 110. This routine (including a receive and transmit portion) has a lower priority (or higher latency) than the routines associated with ADSL Physical Layer 110. Second receiver buffer 116 preferably includes a water mark (data receive threshold) 117, which is set to a value which takes into consideration a variety of data path and transceiver considerations, including expected operating system latencies, the size of buffer 116, etc. Accordingly, such value will vary from application to application, but in general, such value is set to a point usually near an "empty" buffer condition so that data can be continuously loaded without overflow when the system is busy and the receive subroutines associated with ATM Protocol Layer cannot be activated. When a data level in buffer 116 goes above water mark level 117, the receiver part of the ATM protocol layer software routine is triggered by the host system. This routine removes data in the buffer 116 until its cell occupancy level falls below the water mark, or until such routine is interrupted by a higher priority task. Note that, as indicated with the dotted lines in FIG. 1, all the data flow up until this point involves interfaces that handle a time sensitive (synchronous) bit stream. ATM protocol layer 120 is also interfaced to an asynchronous communications path in the operating system and/or other applications 125 within a host computing system. As is apparent from FIG. 1, this is also the last leg of the receive side data link to the upstream transceiver 101. From the perspective of the upstream transceiver, it is imperative, of course, that the entire receive leg of the data link operate in a synchronous manner, and the aforementioned configuration discussed above can accomplish this objective in an ADSL transceiver 100 with minimal latency problems.

On the first leg of the transmit side, a transmit portion (routine) of ATM protocol layer 120 converts asynchronous input data traffic from the operating system and/or other applications into ATM cells. These ATM cells are then loaded into a second transmit buffer 115. As with second receiver buffer 116, second transmit buffer preferably includes a water mark 118, which is set to a value which takes into consideration a variety of data path and transceiver considerations, including expected operating system latencies, the size of buffer 115, etc. Accordingly, such value will vary from application to application, but in general, such value is set to a point usually near a "full" buffer condition so that data is continuously loaded and emptied when there is activity on the transmit side. When a data level in buffer 115 goes below the water mark level, this triggers the transmit portion of ATM protocol layer 120, which adds cells to the buffer until the cell occupancy goes above water mark level 118, or until such routine is interrupted by a higher priority task. The data from the ATM cells in second transmit buffer 115 is modulated by a transmit portion (routine) of ADSL Physical Layer 110 into digital data samples. Such digital samples are then communicated to a first transmit buffer 105, and are retrieved by AFE 103 where they are further converted into an analog data signal that is transmitted through channel 101 back to transceiver 102.

The aforementioned description is fairly typical for implementation in an ADSL software modem. The specifics of such implementation of first receiver buffer 106, first transmitter buffer 105, second receiver buffer 116, second transmit buffer 115, AFE 103, and ADSL Physical Layer 110 are again not important to the present invention, and therefore any combination of computing hardware and software routines can be employed which can perform the tasks required of such transceiver elements. In a preferred embodiment, both second receiver buffer 116 and second transmit buffer 115 are implemented as software FIFOs, meaning they are set up and maintained within a regular system memory by ATM Protocol Layer 120 and/or ADSL Physical Layer 110. This approach has an advantage over pure hardware FIFOs, however, in that such structures can be dynamically re-sized as necessary, based on receive and transmit requirements, system performance, etc. Furthermore, a buffer pointer indicating the starting item of data in a data buffer can be reset as needed, which avoids the latency issues associated with a hardware FIFO where, if "idle" data is present in the queue before real data, such idle data must still be transmitted to flush the buffer.

The important distinction is that the present invention overcomes the latency problems of the prior art through the use of an improved ATM protocol layer 120, and a "dummy" cell buffer 130 as now explained more fully. As noted earlier, at many times, there is no real data traffic on the transmit side coming from applications 125; in such cases, the transmit portion of ATM protocol layer 120 must insert "dummy" cells into second transmit buffer 115. This is because, as also explained above, an overall constant data stream bit rate meeting the ADSL standard must be maintained on this side of ADSL transceiver 100. In other words, the return leg of the ADSL link must be kept synchronous as well, despite the fact that there is an asynchronous data source at one end. These dummy cells are inserted into the bit stream, but are discarded at the other end of the data link by upstream transceiver 102 because they carry no information. Unlike other systems, however, the transmit portion of ATM protocol layer 120 of the present invention does not load second transmit buffer 115 with dummy cells, even when there is no data traffic forthcoming from applications 125. Instead, the transmit portion of ATM protocol layer 120 only loads actual data cells to second transmit buffer 115. Accordingly, second transmit buffer 115 is never loaded with dummy cells, and only contains actual transmit data. To handle the problem of stuffing the bit stream with dummy cells to maintain synchronization, a separate dummy buffer 130 is employed. This dummy buffer contains a predefined cell pattern for the dummy cell that would otherwise be generated, retrieved or transmitted by the transmit subroutine portion of ATM protocol layer 120. Like second transmit buffer 115, dummy buffer 130 is also coupled to ADSL Physical Layer 110, and therefore can provide the dummy cell pattern data as required during a transmit operation. As with second transmit buffer 115, dummy buffer can be implemented as a software structure in system memory of arbitrary size, or in hardware since the cell pattern data is fixed. It is conceivable, of course, that dummy buffer can contain patterns other than dummy cells which may be fixed data patterns that must be transmitted to an upstream transceiver during portions of a data transmission. Again, as with other systems which utilize a transmit buffer "water mark," (or transmit data threshold) a transmit portion of ATM Protocol Layer 120 can be activated when transmit data buffer 115 falls below the transmit water mark.

Figure 2A:
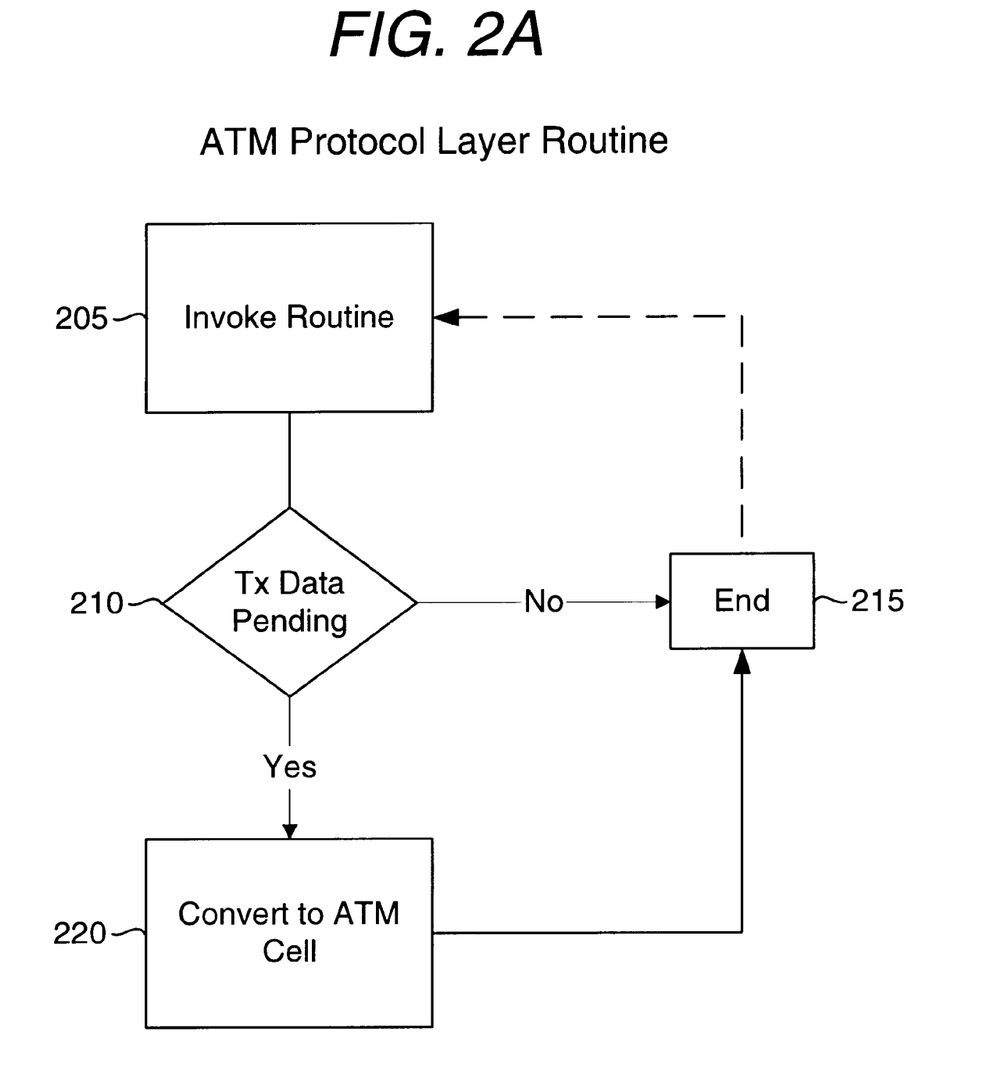
FIGS. 2A and 2B depicts in flow chart form the general method of operation of a ATM Protocol Layer and an ADSL Physical Layer of the present invention as identified in FIG. 1.
Figure 2B:
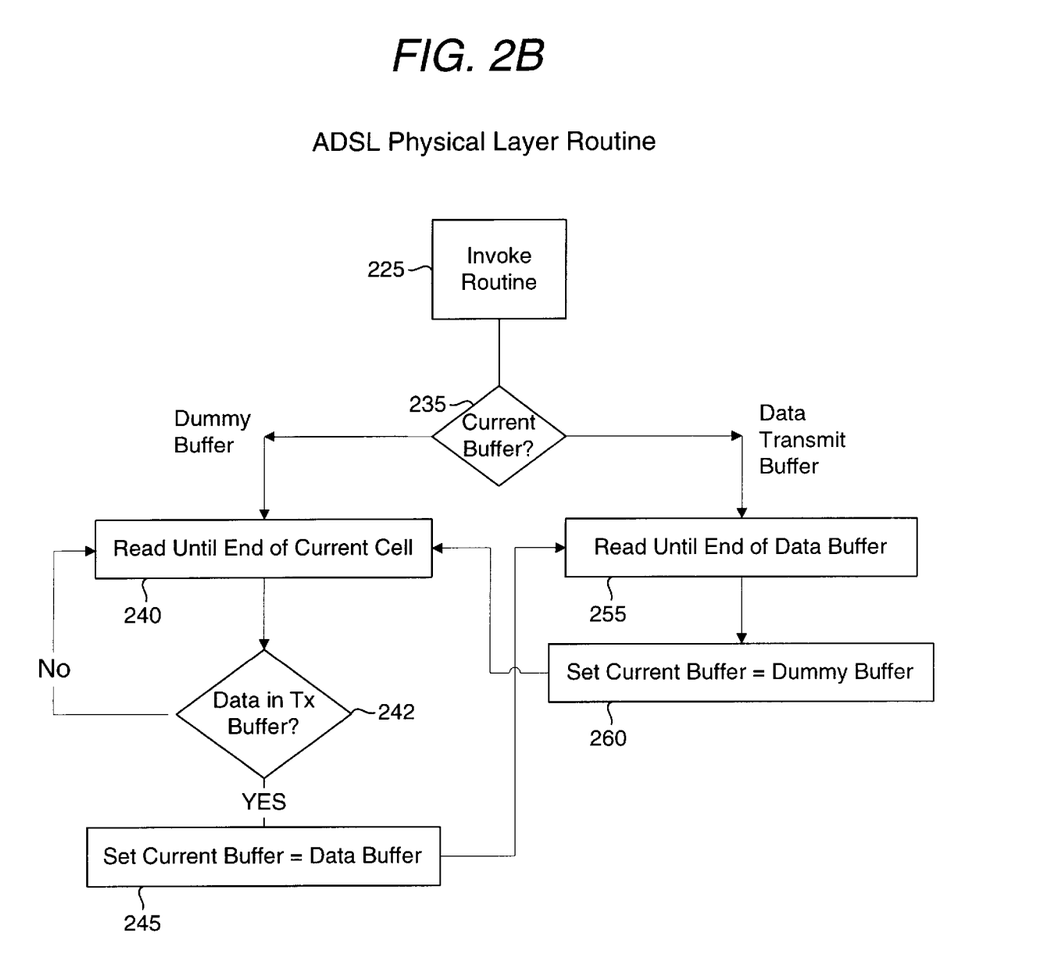

FIGS. 2A and 2B are flow chart forms of the operation of an ATM Protocol Layer 120 routine, and an ADSL Physical layer 110 routine, respectively, as implemented in a preferred embodiment of the present invention. For the ATM Protocol Layer 120 transmit routine shown in FIG. 2A, the following steps are executed: first, at step 205, the routine is invoked when the cell occupancy level in second transmit data buffer 215 falling below a water mark level value 218. Then, at step 210, an examination is made to determine if there is additional data from applications 225 that needs to be transmitted. If not, the routine ends at step 215; i.e. no dummy data blocks (ATM sized dummy cells) are loaded into second transmit data buffer 215. If there is data that needs to be sent, it is processed at step 220 using any one of a number of well-known techniques so that data is converted into a logical data block (i.e. ATM cells) of any suitable length and format for the particular data link.

Thus, second transmit data buffer 115 only contains actual logical data blocks to be transmitted, and not dummy cell data, which means that latency is reduced and system performance is improved. This can be seen from a simple example; in a conventional approach, if dummy cells are loaded into second transmit data buffer 115, they will fill such buffer, causing a data level to rise, and potentially exceeding the water mark level. This means that ATM protocol routine 120 will not be invoked, even though there is no real data in the transmit queue. In fact, it is conceivable that second transmit data buffer 115 may contain no real data, and that a large amount of time will be spent flushing this buffer of dummy cells before real data can be processed by ADSL Physical layer 110. Thus, the present invention significantly enhances the value of a transmit buffer data water mark in a synchronous data link that includes "dummy" data cells as data stream "filler," because such water marks, when used with a buffer containing only real data, can now accurately represent the status of the amount of transmit data ready for transmission.

In FIG. 2B, the operation of transmit portion (routine) of ADSL Physical Layer 110 is shown. At step 225, the routine is invoked by the periodic transmit opportunities of ADSL modulated symbols. In T1.413 and G.992 standards, the period for each invocation is approximately 250 µsec. The routine then continues at step 230 to read data from whichever of second transmit data buffer 115 or dummy cell buffer 130 is designated as the "current" buffer, until reaching the end of a current ATM cell. Then, if at step 235 dummy cell buffer 130 is the current buffer, at step 240 it will read such dummy cell, and, at the end of reading such cell, check second transmit data buffer 115 at step 242 to see if contains any real transmitted data cells from applications 225. This is done by setting a buffer pointer to the head of second transmit data buffer 115. If there is any such data, ADSL Physical Layer 110 then switches at step 245 to reading data from second transmit data buffer 115, and designates such buffer as the current buffer. If not, it sets a new buffer pointer to the start of the dummy buffer, and continues to read from dummy cell buffer 130 as before.

On the other hand, if at step 235 second transmit data buffer 115 is the current buffer, it will continue reading from there at step 255 until it reaches the end of such buffer. Once it reaches the end of such buffer, it will then switch at step 260 to reading from dummy buffer 130, and designates such buffer as the current buffer.

It can be seen from the above description that at any moment in time, the worst case maximum latency, from a data transmit perspective, is at most one ATM cell in duration. The best case minimum latency, conversely, is 0. Thus, the average expected latency with the present invention is only half of an ATM cell size. Moreover, such latency is completely independent of the operating system latency, which is a significant benefit for an ADSL based software modem, because of the wide variation in performance and latency of computing systems incorporating the same. Accordingly, the present invention can be advantageously employed in any synchronous transmission link which utilizes a predefined "idle" signal pattern to compensate for sources of asynchronous data transport.

Although the present invention has been described in terms of a preferred embodiment, it will be apparent to those skilled in the art that many alterations and modifications may be made to such embodiments without departing from the teachings of the present invention. It will also be apparent to those skilled in the art that for purposes of the present discussion, the block diagram of the present invention has been simplified. The microcode and software routines executed by the host processor to effectuate the inventive methods may be embodied in various forms, including in a permanent magnetic media, a non-volatile ROM, a CD-ROM, or any other suitable machine-readable format. Accordingly, it is intended that the all such alterations and modifications be included within the scope and spirit of the invention as defined by the following claims.

What is claimed is:

1. A system for transmitting data between a synchronous data channel and an asynchronous operating system executing on a host computer, said system comprising:

a logical data layer operating within the asynchronous operating system, said logical data layer being capable of receiving a data block corresponding to actual data to be transmitted by the asynchronous operating system, and further being capable of converting said data block into an actual data logical block; and a transmit data buffer coupled to said logical data layer for storing said actual data logical block after it is processed by said logical data layer; and a dummy data buffer for storing a dummy data logical block corresponding to a logical data block containing no actual operating system data; and a physical data layer coupled to said transmit data buffer, said dummy data buffer, and the synchronous data channel, said physical data layer being capable of converting said actual data logical block into actual data digital signals for transmission in said synchronous data channel, and said physical data layer further being capable of converting said dummy data logical block to dummy data digital signals for transmission in said synchronous data channel; and wherein said physical data layer transmits said actual data digital signals to the synchronous data channel when said transmit data buffer contains an actual data logical clock and otherwise transmits said dummy data digital signals.

2. The system of claim 1, further wherein said logical data layer converts said data block into an actual logical data block having a cell format corresponding to an Asynchronous Transfer Mode (ATM) cell.

3. The system of claim 1, further wherein said logical data layer is configured such that when no actual data is available for transmission from application programs running in the asynchronous operating system, said logical data layer does not load any actual data logical blocks in said transmit data buffer.

4. The system of claim 1, further wherein said transmit data buffer includes a data transmit threshold value, such that when said transmit data buffer contains an amount of data less than said data transmit threshold value, said logical data layer is activated to determine if additional actual data is available for transmission from application programs running in the asynchronous operating system.

5. The system of claim 1, wherein said dummy data logical block is the same size as a single actual data logical block and corresponds to a single ATM cell.

6. The system of claim 1, wherein said logical data layer is an ATM protocol routine executed by a host processing device within a computing system.

7. The system of claim 6, wherein said physical data layer is an ADSL physical layer routine executed by said host processing device.

8. The system of claim 7, further wherein said ADSL physical data layer routine is executed with a higher operating system priority and/or lower latency than said ATM protocol routine.

9. The system of claim 7, wherein after sending a dummy data digital signal, said ADSL physical data layer routine checks said transmit data buffer to determine if any actual data logic block should be converted and transmitted.

10. The system of claim 1, further wherein a latency in said synchronous channel is no greater than a time required to transmit said dummy data logical block.

11. The system of claim 1, further wherein a latency in said synchronous channel is substantially independent of any latency inherent in said asynchronous operating system.

12. The system of claim 1, further including a downstream transceiver front end circuit coupled to said physical data layer and being capable of converting said actual data digital signals and said dummy data digital signals into actual data analog signals and dummy data analog signals respectively for transmission through the synchronous channel to a second upstream transceiver.

13. The system of claim 12, further including a second transmit data buffer coupled between said physical data layer and said downstream transceiver front end circuit for storing data corresponding to said real data digital signals and said dummy data digital signals.

14. The system of claim 13, further including a first receive data buffer coupled between said physical layer and said downstream transceiver front end circuit for storing data corresponding to received data digital signals from said upstream transceiver.

15. The system of claim 14, further including a second receive data buffer coupled between said physical data layer and said logical data layer for storing data corresponding to received data logical blocks from said upstream transceiver.

16. The system of claim 1, wherein said real time data channel is a data link transmitting data symbols in accordance with ADSL transmission protocol standards.

17. A machine executable program executed by a host processing device for transmitting data between a synchronously operated high data channel and one or more applications programs running on an asynchronously operated operating system, said program comprising:
   a first priority routine executed by the host processing device, said first priority routine being configured such that:
      (a) said first priority routine determines whether there is actual data to be transmitted by such operating system; and
      (b) when actual data is to be transmitted:
         said first priority routine converts any such actual data into an actual data logical block; and
         said first priority routine buffers said actual data logical block; and
         when no actual data is to be transmitted, said first priority routine performs no further data transmission operations;
   a second priority routine, said second priority routine being configured such that:
      (d) when actual data is to be transmitted said second priority routine converts said actual data logical block into actual data digital signals for transmission in the high speed data channel; and
      (e) when no actual data is to be transmitted, said second priority routine alternatively converts a dummy data logical block to dummy data digital signals for transmission in said real time data channel,
   wherein latencies associated with the operating system transferring data to the data channel are substantially eliminated.

18. The program of claim 17, wherein said first routine converts said actual data into ATM cells.

19. The program of claim 17, wherein said second routine converts said actual data logical block and said dummy data logical block into discrete multi-tone modulated signals compatible with an ADSL protocol used in said high speed channel.

20. The program of claim 17, further wherein said first priority routine is activated when a number of actual data logic blocks to be transmitted falls below a predetermined threshold value.

21. The program of claim 17, further wherein said second routine has a higher priority for execution within the operating system than said first routine.

22. The program of claim 17, further wherein a latency in said high speed channel is no greater than a time required to transmit said dummy data logical block.

23. The program of claim 22, further wherein a latency in said high speed channel is substantially independent of any latency caused by said operating system.

24. A method of transmitting data between a synchronous data channel and a non-real time operating system executing on a host computer, said method comprising the steps of:

(a) determining if there is actual data to be transmitted by the non-real time operating system;
(b) converting any such actual data into an actual data logical block within a protocol layer software routine operating within the non-real time operating system; and
(c) buffering said actual data logical block; and
(d) determining whether an actual data logical block has been buffered; and
(e) when an actual data logical block has been buffered, converting said actual data logical block into actual data digital signals for transmission in said synchronous data channel; and
   when no actual data logical block has been buffered, converting a dummy data logical block to dummy data digital signals for transmission in said synchronous data channel.

25. The method of claim 24 wherein actual logical data block has a cell format corresponding to an ATM cell.

26. The method of claim 24, further wherein only actual data logic blocks are buffered.

27. The method of claim 24, further wherein a plurality of said actual data logical blocks are buffered; and further wherein when a number of said plurality of actual data logical blocks falls below a predetermined threshold value, steps (a) through (c) are repeated.

28. The method of claim 24, wherein said dummy data logical block is the same size as a single actual data logical block, and corresponds to a single ATM cell.

29. The method of claim 24, wherein steps (a) through (c) are performed by a first routine executed by a processing device within a computing system.

30. The method of claim 29, wherein steps (d) and (e) are performed by a second routine executed by said processing device.

31. The method of claim 30, further wherein said second routine is executed with a higher priority and/or lower latency than said first routine.

32. The method of claim 29, wherein after sending a dummy data digital signal at step (e), step (d) is repeated, and if no actual data logic block exists, step (e) is repeated.

33. The method of claim 24, further wherein a latency in said synchronous channel is no greater than a time required to transmit said dummy data logical block.

34. The method of claim 24, further wherein a latency in said synchronous channel is substantially independent of any latency caused by said asynchronous time operating system.

35. The method of claim 24, further including a step (f): converting said real data digital signals and said dummy data digital signals into real data analog signals and dummy data analog signals respectively for transmission through the synchronous channel to a second upstream transceiver.

36. The method of claim 35, further including a step (g): buffering data corresponding to said real data digital signals and said dummy data digital signals.

37. The method of claim 36, further including a step (h): buffering data corresponding to received data digital signals from said upstream transceiver.

38. The method of claim 37, further including a step (i): buffering data corresponding to received data logical blocks from said upstream transceiver.

39. The method of claim of claim 24, wherein said synchronous data channel is a data link transmitting data symbols in accordance with ADSL transmission protocol standards.

40. A method of reducing latency in a software transceiver between a non-real time operating system running on a host computing system coupled to a high speed data channel, said method comprising the steps of:

(a) executing a first priority routine within the non-real time operating system to determine if there is actual data to be transmitted by such operating system;

(b) when actual data is to be transmitted said first priority routine:
converts any such actual data into an actual data logical block;
buffers said actual data logical block; and
when no actual data is to be transmitted, said first priority routine performs no further data transmission operations;

(c) executing a second priority routine [running in the] within the non-real time operating system such that:
said second priority routine converts said actual data logical block into actual data digital signals for transmission in the high speed data channel;
said second priority routine converts a dummy data logical block to dummy data digital signals for transmission in said real time data channel to maintain a continuous data stream in said high speed data channel.
wherein latencies associated with the non-real time operating system transferring data to the data channel are substantially eliminated.

41. The method of claim 40, wherein said actual data logical blocks have a cell format corresponding to ATM cells.

42. The method of claim 40, wherein said actual data digital signals are discrete multi-tone modulated signals compatible with an ADSL protocol used in the channel.

43. The method of claim 40, further wherein said first priority routine is activated when a number of actual data logic blocks to be transmitted falls below a predetermined threshold value.

44. The method of claim 40, further wherein said second routine is executed with a higher priority than said first routine.

45. The method of claim 40, further wherein a latency in said high speed channel is no greater than a time required to transmit said dummy data logical block.

46. The method of claim 45, further wherein a latency in said high speed channel is substantially independent of any latency associated with the non-real time operating system.

47. An xDSL compatible software modem operating in cooperation with a host processing device which executes an asynchronous operating system, the modem comprising:
an Asynchronous Transfer Mode (ATM) layer routine implemented in software that is executed by the host processing device with a first priority level for processing ATM formatted data cells; and
an xDSL physical layer routine implemented in software that is executed by the host processing device with a second priority level, said second level of priority being higher than said first priority level, and which physical layer routine is used for modulating and/or demodulating discrete multi-tone (DMT) data signals; and
a software buffer for storing ATM formatted data cells passed between said ATM layer routine and said physical layer routine, said software buffer being controlled so as to minimize latency of the xDSL compatible software modem.

48. The modem of claim 47 further wherein dummy ATM cells are passed to the xDSL physical layer routine only when said xDSL physical layer requires data for modulation, and there are insufficient ATM formatted data cells in said software buffer.

49. The modem of claim 47 wherein said software buffer does not store dummy data, and said dummy ATM cells are generated by a separate dummy cell buffer.

50. The modem of claim 47 wherein said ATM layer routine is a delayed procedure call (DPC).

51. The modem of claim 50 wherein said xDSL physical layer routine is an interrupt service routine.

52. The modem of claim 47 wherein said latency is on the average approximately ½ of an ATM cell size and is substantially independent of the asynchronous operating system.

53. The modem of claim 47 wherein the xDSL compatible software modem complies with protocols associated with T1.413 and/or G.992 standards, and said xDSL physical layer routine is invoked in accordance with transmit requirements of such standards.

54. The modem of claim 47 further including a software receive buffer for storing ATM formatted cells demodulated by the xDSL physical layer routine to be used by the ATM layer routine.

55. The modem of claim 54 wherein said software receive buffer is configured to include a data receive threshold, such that said ATM layer routine is invoked when said data receive threshold is reached.

56. A method of operating an xDSL compatible software modem on a host processing device that also executes an asynchronous operating system, the method comprising the steps of:
(a) operating an Asynchronous Transfer Mode (ATM) layer software routine with a first priority level for processing ATM formatted data cells using the host processing device; and
(b) operating an xDSL physical layer software routine with a second priority level using the host processing device, said second level of priority being higher than said first priority level, and which physical layer routine is used for modulating and/or demodulating discrete multi-tone (DMT) data signals; and
(c) storing ATM formatted data cells passed between said ATM layer routine and said physical layer routine in a software buffer; and
(d) controlling said software buffer so as to minimize latency of the xDSL compatible software modem.

57. The method of claim 56 wherein dummy ATM cells are passed to the xDSL physical layer routine only when said xDSL physical layer requires data for modulation, and when there are insufficient ATM formatted data cells in said software buffer.

58. The method of claim 56, wherein said software buffer does not store dummy data, and said dummy ATM cells are generated by a separate dummy cell buffer.

59. The method of claim 56, wherein said latency is on the average approximately ½ of an ATM cell size and is substantially independent of the asynchronous operating system.

60. The method of claim 56, wherein the software modem complies with protocols associated with T1.413 and/or G.992 standards, and said xDSL physical layer routine is invoked in accordance with transmit requirements of such standards.

61. The method of claim 56 further including a step (e): storing received ATM formatted cells demodulated by the xDSL physical layer routine to be used by the ATM layer routine in a receive software buffer.

62. The method of claim 61 wherein said software receive buffer is configured to include a data receive threshold, such that said ATM layer routine is invoked when said data receive threshold is reached.

* * * * *

UNITED STATES PATENT AND TRADEMARK OFFICE
CERTIFICATE OF CORRECTION

PATENT NO. : 6,233,250 B1
APPLICATION NO. : 09/191569
DATED : May 15, 2001
INVENTOR(S) : Liu et al.

It is certified that error appears in the above-identified patent and that said Letters Patent is hereby corrected as shown below:

Drawings,
Figure 1, reference numeral "110" designating "Software Modem" should be -- 100 --; and "Software Modem" should be -- ADSL Transceiver System --.

Column 4,
Line 20, "does" should be -- does not --.

Column 6,
Line 4, "a system 100" should be -- an ADSL transceiver system 100 --.
Line 9, "System 100" should be -- ADSL transceiver system 100 --.
Line 10, "101" should be -- 102 --.
Line 11, "102" should be -- 101 --.
Line 15, "transceiver 100" should be -- ADSL transceiver system 100 --.

Column 9,
Line 10, "at step 230" should be deleted.

Column 13,
Line 12, "[running in the]" should be deleted.
Line 66, "said dummy ATM cells" should be -- dummy ATM cells --.

Column 14,
Line 48, "said dummy ATM cells" should be -- dummy ATM cells --.

Signed and Sealed this

Twenty-seventh Day of June, 2006

JON W. DUDAS
*Director of the United States Patent and Trademark Office*